Figure 3:
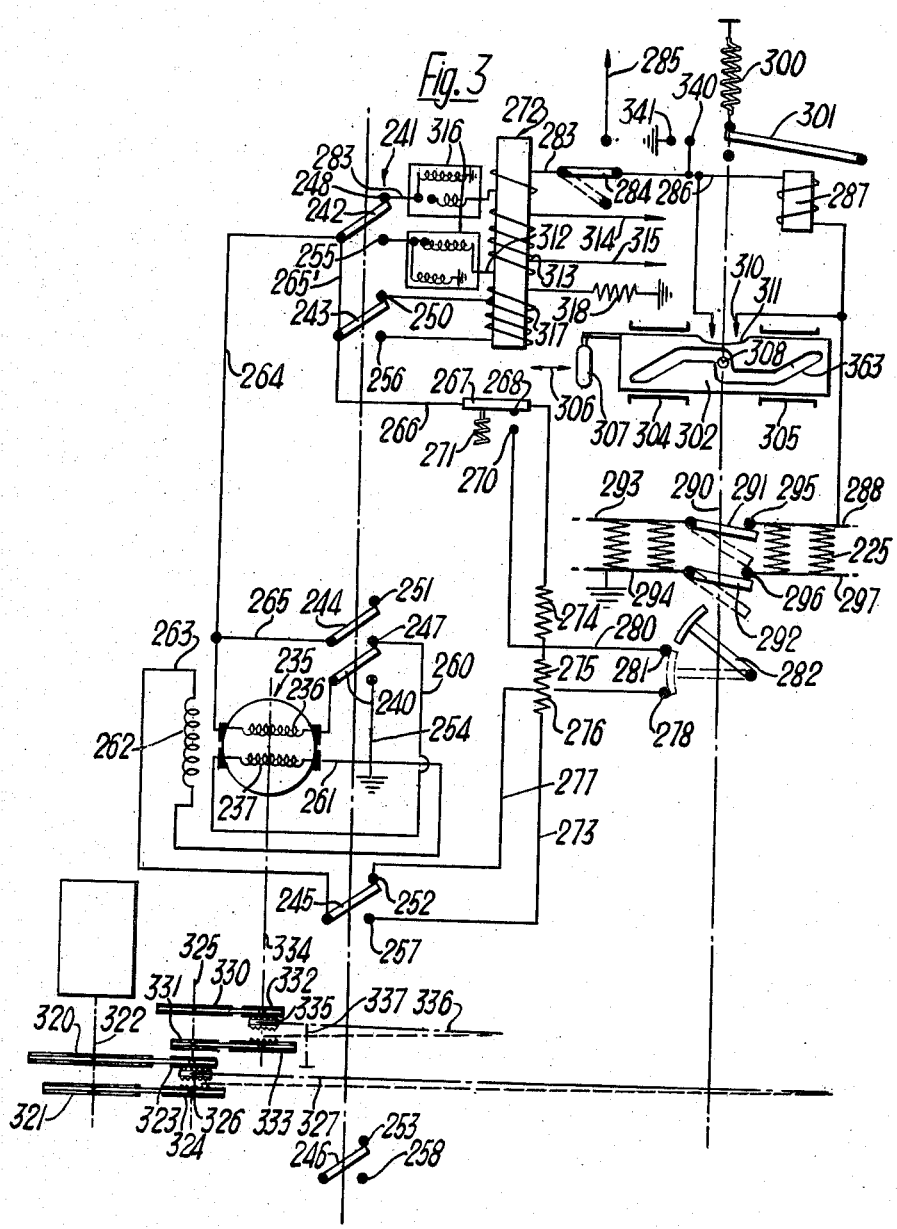

May 5, 1964    P. EISLER    3,132,228
METHOD OF HEATING IN VEHICLES
Filed Jan. 19, 1961    4 Sheets-Sheet 1
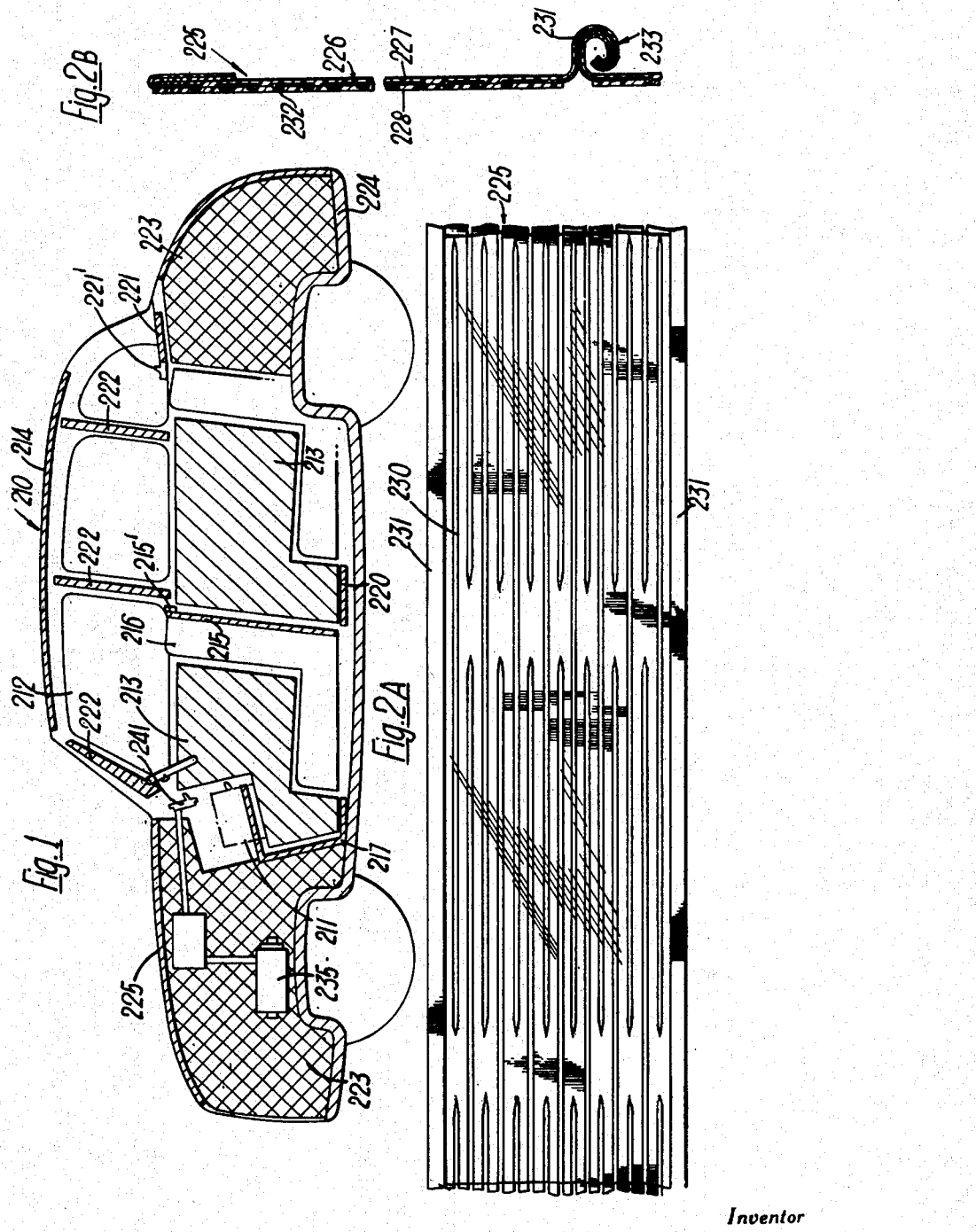
Inventor
Paul Eisler
By
Stevens, Davis, Miller & Mosher
Attorneys May 5, 1964
P. EISLER
3,132,228
METHOD OF HEATING IN VEHICLES
Filed Jan. 19, 1961
4 Sheets-Sheet 3
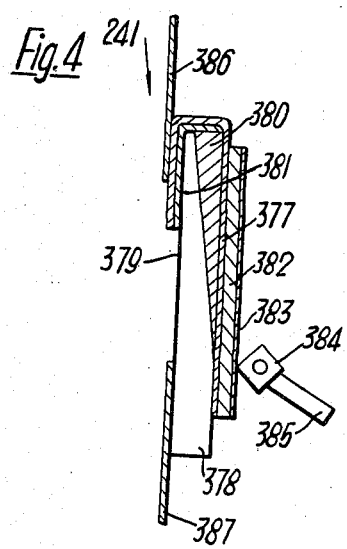
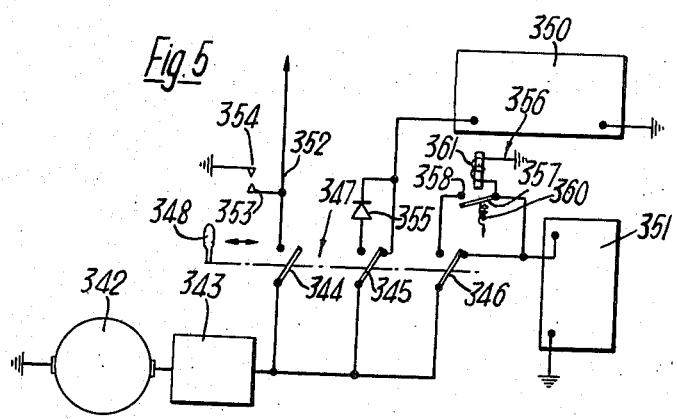
Inventor
Paul Eisler
By
Stevens, Davis, Miller & Mosher
Attorneys

United States Patent Office 3,132,228
Patented May 5, 1964

3,132,228
METHOD OF HEATING IN VEHICLES
Paul Eisler, 57 Exeter Road, London NW. 2, England
Filed Jan. 19, 1961, Ser. No. 83,719
Claims priority, application Great Britain Jan. 25, 1960
20 Claims. (Cl. 219—20)

This invention concerns the heating of vehicles.

The invention is applicable not only to land vehicles, such as motor cars, buses and vans, but also to water going vehicles such as motor boats.

The invention will, however, for convenience, be described primarily with reference to its use on motor cars.

The conventional method of heating motor cars usually provides for an influx of hot air passing through a heater supplied with hot water derived from the cooling system of the engine.

Whilst such a heating system has the advantage of not essentially reducing the power of the engine available for moving the car, it has the great disadvantage that it takes a considerable time before it becomes effective when the car is started from cold.

According therefore to the present invention there is provided a vehicle having a space therein for the seating of at least one occupant thereof, electrical heating film means carried by and insulated with respect to at least one of the boundary walls of said space, said electrical heating film means being arranged to emit radiant heat into said space, electrical power supply means carried by the vehicle and arranged in a circuit containing both the electrical heating film means and a switch, and heat emitting means for continuously emitting heat into said space after an initial period has elapsed since the closure of said switch, said heat-emitting means emitting heat into said space at a substantially lower rate than heat is emitted into said space by said electrical film heating means during the said initial period. The term "initial period" as used in this description means a very short period of time depending upon the outside temperature during which the space in the vehicle is flooded with heat from the electrical heating film prior to the normal operational period of the heating system. As will be seen from the subsequent description it may be several minutes in cold weather start until the interior of the vehicle reaches the desired temperature and thereafter heat will be supplied at a very much reduced rate.

Preferably the rate of heat emission into said space from the said electrical heating film means during the said initial period is at least four times as great as the rate of heat emission into said space from the said heat emitting means, after the end of said initial period.

Preferably also the electrical heating film means reaches its maximum rate of heat emission within one minute of the closure of said switch.

Thus the vehicle may be very swiftly "flooded" with heat.

The electrical heating film means, on the closure of said switch is preferably raised to a temperature within the range 75° F. to 180° F. and is preferably supplied with at least 15 watts of power for every square foot of the surface area thereof which emits radiant heat into said space. Preferably the electrical power supply means are adapted to supply said electrical heating film means with power at a voltage of less than 50 volts.

The heat emitting means may comprise means for continuously supplying the electrical heating film means with less electric power than is supplied thereto during the said initial period. Alternatively, or additionally, the heat emitting means may comprise means for continuously supplying said space with waste heat from the engine of the vehicle.

The said switch or a portion thereof may comprise a first contact member having relatively high and relatively low resistance portions, a second contact member which is adapted to be moved relatively to the first contact member and into and out of contact with the low resistance portion thereof, and means for causing the second contact member, when moving relatively towards the first contact member, to contact the said high resistance portion prior to contacting the said low resistance portion.

Additional electrical film heating means may, if desired, be embedded in a wall or walls of the vehicle. Such films may, for example, be used for effecting de-icing of the said walls or drying of the paint thereon.

Preferably the electrical heating film means comprises a plurality of films some of which are permanently connected to earth and the remainder of which are connected to earth by a breakable connection.

The electrical power supply means may comprise an engine driven generator which is adapted to supply a predetermined amount of power to the electrical heating film means even during idling speed of the engine of the vehicle.

Preferably the generator has two windings, means being provided for selectively arranging said windings in series and in parallel.

Preferably there are means, operative upon the rotational speed of the engine reaching a predetermined value, for altering the regulation of the generator.

Figure 6:
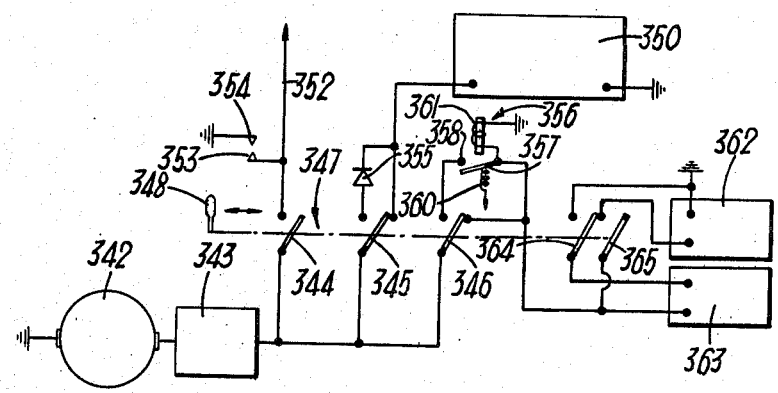
Figure 7:
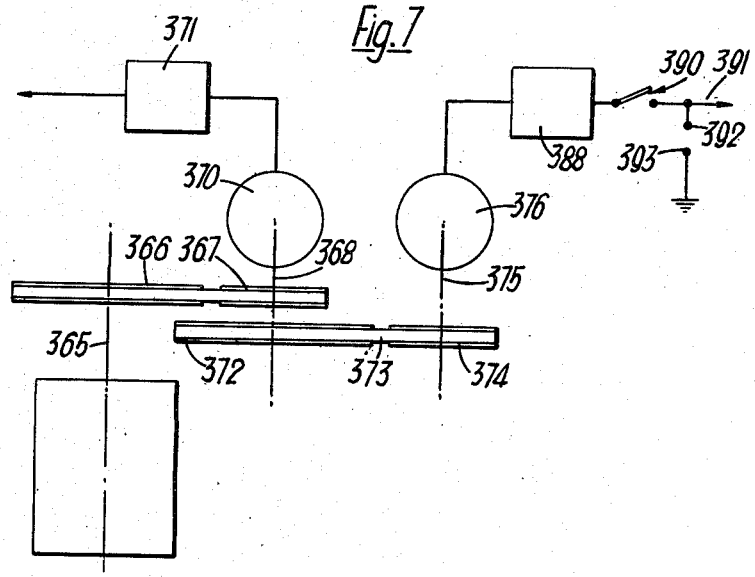

The invention is illustrated, merely by way of example, in the accompanying drawings, in which:

FIGURE 1 is a diagrammatic side view of a vehicle according to the present invention, FIGURES 2A and 2B are respectively a plan view and a section through electrical heating films employed in the heating of the vehicle of FIGURE 1, FIGURE 3 illustrates an electrical circuit employed in the vehicle of FIGURE 1, FIGURE 4 is a sectional view of a switch forming part of said circuit, and FIGURES 5, 6 and 7 are diagrams illustrating alternative embodiments of the present invention.

In FIGURE 1 there is shown a motor car 210 which is provided with a heater 211 of conventional type. The heater 211 effects heating of the interior 212 of the motor car by using some of the waste heat of the car engine, the heater 211 incorporating a heat exchange device (not shown) in which water which has been heated by the waste heat from the engine is in heat exchange relationship with a supply of air which is being drawn into the interior 212 of the motor car.

The majority of the surface area of the non-transparent walls bounding the interior 212 of the car, is covered by electrical heating films. Thus electrical heating films 213 are provided as part of the door linings of the car, one or more electrical heating films 214 are provided as part of the roof lining of the car, and electrical heating film or films 215 are provided on the rear face of the front seat or seats 216 of the car. A switch 215' is provided so that the passengers at the rear of the car may switch on the films 15. There is also an electrical heating film 217 at the forward end of the interior 212 of the car, and film 217 extending from the floor to and beneath a shelf (not shown). An electrical heating film 220 is, moreover, provided on the floor of the car, and an electrical heating film 221 is provided adjacent the lower edge of the rear window of the car. There are also provided, in the linings of the body pillars, heating tapes 222 which employ electrical heating films.

The electrical heating films 213—215, 217, and 220 are provided for the heating of the interior 212 of the car, while the film 221, which is provided with a switch 221', is for effecting de-misting of the rear window of the car. There are also provided additional electrical heating films 223 which are carried by the bodywork of the car and which are adapted to effect de-icing thereof and drying of the paint thereon. Heating tapes 224, whose purpose is similar to that of the films 223, are carried by the lower edge of the bodywork of the car.

The electrical heating films employed may be as disclosed in any of my co-pending patent applications Serial Nos. 747,314, now Patent 2,971,073; 717,315 (filed July 8, 1958); 752,384 (filed July 31, 1958); 783,633, now Patent 3,020,378; 786,359, now Patent 3,026,234; and 11,761 (filed February 29, 1960). One particular preferred form of electrical heating film is however shown in FIGURES 2A and 2B.

In FIGURES 2A and 2B there is shown an electrical heating film 225 comprising a metallic (e.g. aluminium) heating foil 226 which is disposed between two insulating layers 227, 228. The metallic heating foil 226, as indicated in FIGURE 2A is crimped, the foil 226 being provided with a number of longitudinally extending narrow slits 230 so as to present a number of meander paths to current flowing through the foil 226.

The foil 226 is elastically pre-stressed so that if its cross-section becomes weakened by an accidental hair-line crack (or burn or hole), the parts of the foil on opposite sides of the crack will retract so that the circuit is swiftly broken, the layers 227, 228 being such as to permit such retraction.

The foil 226 is of greater breadth than the insulating layer 228, so as to present longitudinal edge portions 231 which are folded back onto the outer surface of the insulating layer 227. The portions of the foil 226 immediately adjacent the slits 230 are folded back on themselves, as indicated at 232.

The foil 226 is lacquered on its rightward facing surface as viewed in FIGURE 2B. It will therefore be appreciated that the portions of the foil 226 on opposite sides of a slit 230 are insulated from each other both by the provision of the lacquer and by the fact that the layers 227, 228 of the insulation, merge into each other in the slits 230. Thus any accidental contact between portions of the foil 226 on opposite sides of a slit 230 is very unlikely to result in electrical contact being made between these portions.

The edge portions 231 of the foil 226 may be employed as indicated at 233 in joining one film 225 to an adjacent such film. The joint is, of course, shown in FIGURE 2B in an exploded form prior to being flattened down.

The films 225 are adapted to be brought within one minute to a temperature within the range 75°–180° F. and to be supplied with at least 15 watts of power per square foot of surface area facing the interior 212, the power being supplied at a voltage of less than 50 volts.

Electrical heating films (not shown) may also be employed in floor mats and loose seat covers and may, if desired, be provided with a conductive layer consisting of carbon or graphite instead of metal.

The insulating layer 227 facing the interior 212 may be of decorative form and both the insulating layers 227, 228 may be of plastic, elastomeric textile or paper material. A preferred insulating material is a flameproof material such as polyvinyl chloride.

The insulating layer 228, which may be dispensed with if the electrical heating film is fixed to an insulated surface, should, if provided, be relatively thick and should be a good thermal insulator. Thus the layer 228 may be constituted by a layer of a foamed synthetic resin.

The car 210 has a generator 235 whose armature has windings 236, 237 (FIGURE 3). The winding 236 is connected to a pole 240 of a multi-pole two position switch 241.

A switch 246 is provided for the heater 211, the switch 246 being movable between an "on" terminal 253 and an "off" terminal 258. The switch 246 may be linked (by means not shown in detail) with the switch 241 in such a way that both may be switched on together but also permitting switch 241 to be switched off before the switch 246.

The switch 241, which is operable from the dashboard of the car, also has poles 242, 243, 244 and 245. In the "closed" position of the switch 241 shown in FIGURE 3, the poles 240, 242, 243, 244 and 245 respectively make contact with contact members 247, 248, 250, 251, and 252. The switch 241 may however be placed in an "open" position in which the poles 240, 242, 243, 244 and 245 respectively make contact with contact members 254, 255, 256, 257, 247.

The contact member 254 is earthed whilst the contact member 247 is connected by a lead 260 to the winding 237, the winding 237 being connected by a lead 261 to a field winding 262 of the generator 235. The field winding 262 is connected by a lead 263 to the pole 245.

The winding 236 is connected by a lead 264 to the pole 242. A lead 265 connects the lead 264 with the pole 244.

It will therefore be appreciated that when the switch 241 is closed the windings 236, 237 are in series while when the switch 241 is open the windings 236, 237 are in parallel.

The pole 243 is connected by a lead 265 to the pole 242 and is connected by a lead 266 to an armature 267. The armature 267 has a contact 268 which is urged towards contact with a contact 270 by means of a spring 271. The armature 267 may be moved by a solenoid 272 to separate the contacts 268, 270.

The armature 267 is connected to the terminal 257 by a line 273 which includes resistances 274, 275, 276.

A line 277 connects the terminal 252 with the junction between the resistances 275, 276 and with a terminal 278. A line 280 connects the contact 270 with the junction between the resistances 274, 275 and with a terminal 281. A contact member 282 may be moved into and out of the position, in which it establishes contact between the contacts 278, 281 so as to effect shorting of the resistance 275 and hence adjustment of the field of the generator 235.

The terminal 248 is connected by a line 283 to a winding of the solenoid 272 and thence to the pole of a single pole three position switch 284. The switch 284 may be moved into an off position, or into positions in which it respectively connects the line 283 with lines 285, 286. The line 285 is connected (by means not shown) to the de-icing and paint drying film 223 and tape 224, whilst the line 286 is connected by way of a solenoid 287 to a busbar 288.

A two position switch device 290 has poles 291, 292 which are respectively permanently connected to busbars 293, 294, the busbar 294 being permanently earthed. The pole 291 is movable between a "closed" position (shown in full lines) in which it contacts a terminal 295 on the busbar 288 and an "open" position (indicated by dotted lines) in which it contacts a terminal 296 on a busbar 297. Each of the busbars 288, 293, 294, 297 may be constituted by strips of foil or by the edge portions 231 of films of the kind shown in FIGURES 2A and 2B.

The pole 292 contacts the terminal 296 in the said "closed" position and is out of contact therewith in the said "open" position.

Electrical heating films 225 are connected between the busbars 288, 297 and between the busbars 293, 294.

The switch device 290 is urged towards the "closed" position by means of a spring 300. When however the voltage of the supply to the solenoid 287 reaches a predetermined value, an armature 301 is attracted towards the solenoid 287 so as to move the switch device 290 against the action of the spring 300 and into the "open position."

A cam member 302 is provided for effecting manual operation of the switch device 290. The cam member 302 has a cam slot 303 therein, and is slidably mounted within sleeves 304, 305. The cam member 302 may be moved backwards and forwards as indicated by the arrow 306, by means of a button 307. The switch device 290 includes a pin 308 which rides in the cam slot 303.

A pair of contacts 310 are connected across opposite sides of the solenoid 287, so that when the two contacts 310 are electrically connected to each other, the solenoid 287 is short circuited.

The cam member 302 has a depressed central portion 311 such that, when the parts are positioned as shown in FIGURE 3, the two contacts 310 are out of contact with each other. When however the button 307 is pushed in either direction away from a central position, the surface of the cam member 302 causes the two contacts 310 to be electrically connected to each other, so as to short circuit the solenoid 287.

It will be appreciated that the operation of the button 307 causes the pin 308 to ride in the cam slot 303 so as to effect movement of the switch device 290 between its two positions.

The terminal 255 of the switch 241 is connected by a line 312 to a winding 313 of the solenoid 272. The winding 313 is tapped by lines 314, 315 which respectively lead to the lighting and ignition circuits (not shown) of the motor car 210 and to the accumulator thereof (also not shown), which supplies the lighting and ignition currents at low speed operation of the engine.

The lines 283, 312 include cut-out devices 316. Each device 316 comprises a solenoid acting against a spring, and ensures that a circuit is made only when the generator 235 is generating a predetermined voltage which is higher than that of the said battery.

The terminals 250 and 256 of the switch 241 are connected to a shunt coil 317 which forms part of the solenoid 272 and which is connected to earth by way of a temperature compensating resistor 318.

Pulleys 320 and 321 are mounted on an engine driven shaft 322, the pulley 320 being of substantially greater diameter than that of the pulley 321. The pulleys 320, 321 are connected by belts to pulleys 323, 324 which are rotatably mounted on a shaft 325. A clutch 326 is movable by a bar 327, the bar 327 being movable by the switch device 290 between a position in which the clutch 326 clutches the pulley 324 to the shaft 325 and another position in which the clutch 326 clutches the pulley 323 to the shaft 325. The diameter of the pulley 323 is substantially less than that of the pulley 324 and it will therefore be appreciated that the speed of rotation of the shaft 325 will depend upon the position of the clutch 326.

The shaft 325 has pulleys 330, 331, secured thereto which are connected by belt drives to pulleys 332, 333 respectively, the pulleys 332, 333 being rotatably mounted on a shaft 334 which drives the generator 235.

A clutch 335 is movable by a bar 336 between a position in which it clutches the pulley 332 to the shaft 334 and another position in which it clutches the pulley 333 to the shaft 334. The pulley 332 is of substantially smaller diameter than that of the pulley 333 and the speed of rotation of the shaft 334 will therefore depend upon the position of the clutch 335.

The bar 336 is connected to the bar 327 by a link 337. The bar 336 is movable between its two positions on movement of the switch 241, the link 337 preventing the clutch 326 from clutching the pulley 323 to the shaft 325 when the clutch 335 is in the position in which it clutches the pulley 333 to the shaft 334.

In operation, when the interior of the car is cold, e.g., at the beginning of a journey, the switches 241, 246 are closed. This brings the car heater 211 into operation (by means not shown) and places the poles of the switch 241 in the full line position shown in FIGURE 3.

The coils 236, 237 of the armature of the generator 235 are therefore placed in series with each other to provide high current and low voltage for starting. With this arrangement, very efficient heating can be obtained, since heat developed in the heating films is proportional to the square of the current.

Current will now pass to the line 283 but, until the speed of the car has reached a certain predetermined value, the voltage of the supply to the solenoid 287 will not be sufficient to move the armature 301 against the action of the spring 300. In consequence, the poles 291, 292 will be in the full line positions shown in FIGURE 3 and the electrical heating films 225 extending between the busbars 288, 297 will be in parallel with the film 225 extending between the busbars 293, 294.

When however the speed of the engine reaches a predetermined value, the solenoid 287 will move the armature 301 against the spring 300 so as to move the poles 291, 292 to their dotted line position. When this occurs the electrical heating films 225 extending between the busbars 288, 297, will be in series with the electrical heating films 225 extending between the busbars 293, 294. At the same time, the clutches 326, 335 will be moved into the position in which they respectively clutch the pulley 324 to the shaft 325 and the pulley 333 to the shaft 334. As a result a regulation of the generator 235 is effected and the heating films 225 are maintained at approximately the same temperature.

The arrangement may be such, that, when the said predetermined engine speed has been reached, the generator will supply up to twice the voltage previously supplied to the films 225. Since, however, the films 225 between the busbars 288, 297 and 293, 294 will be in series at this time, the temperature to which the films 225 will be raised will remain substantially constant.

The spring 271 maintains the contacts 268, 270 in contact with each other, whereby the resistor 274 is short circuited, except when the voltage generated by the generator 235 rises to a predetermined value. When the latter occurs, the solenoid 272 opens the contacts 268, 270 whereby to insert the resistance 274 into the field of the generator 235 so as to effect regulation of the latter.

The generator 235 can be of any type capable of supplying the heavy heating load for the few minutes at which all the films 225 installed in the car are switched on. Features such as the use of high speed for the armature, windings made of foils, such as anodised aluminium foils which can safely reach a very high temperature, and the use of water or oil cooling for the generator provide suitable designs of the generator and help to keep it small. The generator could also, if desired, be an A.C. generator used in combination with a rectifier.

The electrical heating films 225 are of such low heat inertia and are of such mass that they immediately radiate heat into the interior 212 of the car and thus very swiftly "flood" the interior with heat. The heat emitted into the interior 212 when the switch 241 is closed will, of course, in part be due to the fact that the heater 211 will have been switched on as well. Whereas however the heater 211 reaches its maximum rate of heat emission quite slowly, the electrical heating films 225 reach their maximum rate of heat emission very quickly indeed, e.g., at least four times as quickly.

When the car has become sufficiently warm the switch 241 is moved to its open position. As a result, the poles of the switch 241 are moved to a postion shown in dotted lines in which the coils 236, 237 of the armature of the generator 235 are placed in parallel with each other to provide relatively higher voltage and relatively lower current than when the coils are placed in series for starting. This arrangement is used for high speed running of the car, when excessive current is not required for heating films, and current is no longer supplied to the line 283. The line 312 will, however, be live whereby the battery may be charged.

The movement of the switch 241 into its open position may be arranged to leave the heater 211 on, so that the car is thereafter heated from the heater 211 only.

Thus the interior 212 may be almost instantaneously "flooded" with heat on the closure of the switch 241 and may thereafter be supplied with a very much reduced amount of heat so as to maintain the interior 212 at a desired temperature.

The line 286 is connected to a terminal 340 which is spaced from an earthed terminal 341. Thus when the current is supplied to the line 286, a temporary supply of electricity is available for the use of electric kettles, cooking or food heating devices which may be connected between the terminals 340, 341.

The switch 241 is shown in FIGURE 3 as a simple make and break switch. Preferably, however, the parts of the switch 241 which carry a heavy current are formed as shown in FIGURE 4.

The portion of the switch 241 illustrated in FIGURE 4 comprises a metal foil 377 which is connected to a conductor 386. The foil 377 extends about a plate 378 which is connected to a conductor 387.

The plate 378 has a tapering portion 379 to which is secured a carbon wedge 380 so that the plate 378 and the carbon wedge 380 together form a member which is rectangular in cross section. The thickest portion of the wedge 380 is disposed adjacent the conductor 386.

The tapering portion 379 is insulated from the foil 377 by an insulating backing member 381.

The foil 377 is backed by a rubber plate 382 which in turn is backed by a spring steel plate 383. The foil 377 is always in contact with the thickest portion of the carbon wedge 380. The steel plate 383, however, urges the part of the foil 377 remote from the conductor 386 towards a position (not shown) in which it is spaced from the plate 378.

A cam 384 may be rotated by a handle 385 into the position shown in FIGURE 4 in which the part of the foil 377 remote from conductor 386 contacts the plate 378.

Accordingly, when the switch 241 is in the open position, the conductors 386, 387 are electrically interconnected by way of the thickest part only of the wedge 380. The current flowing through the switch 241 when in the open position is therefore very small. As, however, the switch is moved into the closed position as shown in FIGURE 4 the foil 377 is caused to move more and more completely into contact with the whole of the wedge 380 and finally into contact with the plate 378. When this occurs there is a low resistance path through the switch 241. Thus the switch 241, in contrast to conventional switches, is not a "make" and "break" switch but is a switch which gradually closes and opens. Arcing is therefore prevented and surges of current are smoothed.

In FIGURE 5 there is shown an alternative embodiment of the present invention.

In FIGURE 5 a generator 342 is connected by way of a generator control device 343, to poles 344, 345, 346 of a switch 347 which is axially movable by a button 348. In the position shown, the poles 345, 346 are respectively connected to an accumulator 350 and to an accumulator 351.

The accumulator 350 is the normal car accumulator, that is to say the accumulator supplying ignition and lighting current. The accumulator 351 however supplies the heating current.

When however the button 348 is moved towards the left, as seen in FIGURE 5 the pole 344 is connected to a line 352 which supplies current to the films 225. The line 352 also supplies current to a terminal 353 which is spaced from an earth terminal 354 to provide contacts for the food heating devices referred to above. At the same time the pole 345 is connected to the normal car accumulator 350 by way of a rectifier 355.

The rectifier 355 permits the accumulator 350 to be charged, even when the films 225 are being supplied with current, provided the engine is at high speed. The rectifier 355, however, safeguards against discharge of the accumulator 350.

When, moreover, the button 348 is pushed towards the left the pole 346 is connected to the accumulator 351 by way of an overload protection device 356. The overload protection device 356 comprises an armature 357 which is moved away from a terminal 358 by a spring 360. A solenoid 361 is adapted to attract the armature 360 into contact with the terminal 358 as long as the voltage of the accumulator 351 and/or of the generator 342 is sufficiently high.

Accordingly as long as the voltage of the current passing to the accumulator 351 is above a predetermined value, which value is higher than that of the voltage of the accumulator 351, the overload protection device will remain closed and the accumulator 351 will be charged even when the electrical heating films are turned on. The voltage of the accumulator 351 may, for example, be 12 volts.

In FIGURE 6 there is shown a further modification of the present invention, which modification is closely similar to that of FIGURE 5. For this reason the arrangement of FIGURE 6 will not be described in detail, but it will be noted that the twelve volt accumulator 351 of the FIGURE 5 construction has been disposed with and has been replaced by two six volt accumulators 362, 363, both of which are arranged to supply the heating films 225. In the FIGURE 6 construction, the switch 347 includes poles 364, 365, which, when the button 348 is in the "off" position shown, are in series with each other. When however, the button 348 is in the "on" position, the accumulators 362, 363 are in parallel with each other. Thus the accumulators 362, 363 may be charged at 12 volts and discharged at 6 volts. Although the accumulators 362, 363, are shown as separate members, in fact they may each be constituted by half the cells of a common accumulator.

In FIGURE 7 there is shown yet a further embodiment of the invention in which an engine driven shaft 365 drives a pulley 366 which is connected by a belt drive to a pulley 367 on a shaft 368 which drives a generator 370. The generator 370 is connected by way of a generator control 371 to an accumulator (not shown) which supplies the lighting and ignition current of the vehicle.

The shaft 368 carries a pulley 372 which is connected by a belt 373 to a pulley 374 on the shaft 375 of a generator 376. The generator 376 is connected by way of a generator control 388 to a switch 390 which, when closed, supplies current by way of a line 391 to the heating films 225.

A terminal 392 is connected to the line 391 and is closely spaced from an earth terminal 393. Thus electric kettles, food warming devices, or other electrical equipment may be connected across the terminals 392, 393.

The arrangement shown in FIGURE 7, is particularly suitable for old cars in which it would be difficult to provide a large generator which would supply both heating current and lighting and ignition current.

If the car body is made of metal sheet, the films 223 are preferably bonded to it, before it is painted. The films may be supplied with current to heat the metal sheet and thus dry and cure a layer of paint thereon. This makes it possible to use, as car finishes, stoving enamels or other paints requiring the application of heat.

If the car body is made of resin impregnated glass fibre or similar material the incorporation of the heating film therein permits quick setting and curing of the resin.

When the car is serviced the supply of current to the films 223 can shorten the drying time after washing, raining or snowing. When driving through snowy or icy weather snow or ice formation on the respective surfaces of the car can be prevented.

I claim:
1. A vehicle having a space therein for the seating of at least one occupant thereof, boundary walls bounding said space, low temperature electrical heating film means carried by and insulated with respect to the boundary walls of said space, said electrical heating film means covering a majority of the nontransparent surface area of the bondary wall and emitting low temperature radiant heat into said space, low voltage electrical power supply means carried by the vehicle and supplying power to said electrical heating film means at a voltage which is never excessive, a circuit containing the electrical heating film means, the electrical power supply means, and a switch, and heat radiating means for continuously emitting heat into said space after an initial period has elapsed since the closure of said switch, said initial period is that period, the length of which is dependent upon outside temperature, during which the space is flooded with heat prior to the normal operational period of said heating means, said heat radiating means emitting heat into said space at a substantially lower rate than heat is radiated into said space by said electrical film heating means during the said initial period.

2. A vehicle having a space therein for the seating of at least one occupant thereof, boundary walls bounding said space, low temperature electrical heating film means carried by and insulated with respect to the boundary walls of said space, said electrical heating film means covering a majority of the nontransparent surface area of the boundary walls and emitting low temperature radiant heat into said space, low voltage electrical power supply means carried by the vehicle and supplying power to said electrical heating film means at a voltage which is never excessive, a circuit containing the electrical heating film means, the electrical power supply means, and a switch, and heat radiating means for continuously emitting heat into said space after an initial period has elapsed since the closure of said switch, said initial period is that period, the length of which is dependent upon outside temperature, during which the space is flooded with heat prior to the normal operational period of said heating means, the rate of heat emission into said space from the said electrical heating film means during the said initial period being at least four times as great as the rate of heat emission into said space from the said heat radiating means after the end of said initial period.

3. A vehicle having a space therein for the seating of at least one occupant thereof, boundary walls bounding said space, low temperature electrical heating film means carried by and insulated with respect to the boundary walls of said space, said electrical heating film means covering a majority of the nontransparent surface area of the boundary walls and emitting low temperature radiant heat into said space, low voltage electrical power supply means carried by the vehicle and supplying power to said electrical heating film means at a voltage which is never excessive, a circuit containing the electrical heating film means, the electrical power supply means, and a switch, and heat radiating means for continuously emitting heat into said space after an initial period has elapsed since the closure of said switch, said initial period is that period, the length of which is dependent upon outside temperature, during which the space is flooded with heat prior to the normal operational period of said heating means, said heat radiating means emitting heat into said space at a substantially lower rate than heat is radiated into said space by said electrical film heating means during the initial period, the electrical heating film means reaching its maximum rate of heat emission within one minute of the closure of said switch.

4. A vehicle having a space therein for the seating of at least one occupant thereof, boundary walls bounding said space, low temperature electrical heating film means carried by and insulated with respect to the boundary walls of said space, said electrical heating film means covering a majority of the nontransparent surface area of the boundary walls and emitting low temperature radiant heat into said space, low voltage electrical power supply means carried by the vehicle and supplying power to said electrical heating film means at a voltage which is never excessive, a circuit containing the electrical heating film means, the electrical power supply means, and a switch, and heat radiating means for continuously emitting heat into said space after an initial period has elapsed since the closure of said switch, said initial period is that period, the length of which is dependent upon outside temperature, during which the space is flooded with heat prior to the normal operational period of said heating means, said heat radiating means emitting heat into said space at a substantially lower rate than heat is radiated into said space by said electrical film heating means during the said initial period, the electrical heating film means reaching its maximum rate of heat emission within one minute of the closure of said switch, and the electrical heating film means, on the closure of said switch, being raised to a temperature within the range 75° F. to 180° F.

5. A vehicle having a space therein for the seating of at least one occupant thereof, boundary walls bounding said space, low temperature electrical heating film means carried by and insulated with respect to the boundary walls of said space, said electrical heating film means covering a majority of the nontransparent surface area of the boundary walls and emitting low temperature radiant heat into said space, low voltage electrical power supply means carried by the vehicle and supplying power to said electrical heating film means at a voltage which is never excessive, a circuit containing the electrical heating film means, the electrical power supply means, and a switch, and heat radiating means for continuously emitting heat into said space after an initial period has elapsed since the closure of said switch, said initial period is that period, the length of which is dependent upon outside temperature, during which the space is flooded with heat prior to the normal operational period of said heating means, said heat radiating means emitting heat into said space at a substantially lower rate than heat is radiated into said space by said electrical film heating means during the said initial period, the electrical heating film means reaching its maximum rate of heat emission within one minute of the closure of said switch, and the electrical heating film means, on the closure of said switch, being raised to a temperature within the range 75° F. to 180° F., the low voltage electrical power supply means supplying the low temperature electrical heating film means, during the said initial period, with at least 15 watts of power for every square foot of the surface area thereof which emits radiant heat into said space.

6. A vehicle as claimed in claim 5 in which the low voltage electrical power supply means are adapted to supply said low temperature electrical heating film means with power at a voltage of less than 50 volts.

7. A vehicle having a space therein for the seating of at least one occupant thereof, boundary walls bounding said space, low temperature electrical heating film means comprising a metal foil which is faced towards the inside of said space with a layer of insulating material and being carried by and insulated with respect to the boundary walls of said space, said electrical heating film means covering a majority of the nontransparent surface area of the boundary walls and emitting low temperature radiant heat into said space, low voltage electrical power supply means carried by the vehicle and supplying power to said electrical heating film means at a voltage which is never excessive, a circuit containing the electrical heating film means, the electrical power supply means and a switch, and means for continuously supplying said space with waste heat from the engine of the vehicle, said waste heat means emitting heat into said space at a substantially lower rate than heat is radiated into said space by the said electrical heating film means.

8. A vehicle as claimed in claim 7 in which the metal foil is elastically pre-stressed, the film comprising at least one layer of an insulating material which is fixed to the metal foil and which permits the foil to rupture at any point where its cross section has been substantially weakened.

9. A vehicle as claimed in claim 7 in which each foil is provided with a series of spaced slits which divide the foil into a series of interconnected portions, which present at least one meander path to the current passing therethrough.

10. A vehicle as claimed in claim 7 in which the electrical heating film means comprises a plurality of heating films the metal foil of each of which projects outwardly of its layer of insulating material and is electrically connected to the metal foil of an adjacent heating film.

11. A vehicle having a space therein for the seating of at least one occupant thereof, boundary walls bounding said space, low temperature electrical heating film means carried by and insulated with respect to the boundary walls of said space, said electrical heating film means covering a majority of the nontransparent surface area of the boundary walls and emitting low temperature radiant heat into said space, low voltage electrical power supply means carried by the vehicle and supplying power to said electrical heating film means at a voltage which is never excessive, a circuit containing the electrical heating film means, the electrical power supply means, and a switch, and heat radiating means for continuously emitting heat into said space after an initial period has elapsed since the closure of said switch, said initial period is that period, the length of which is dependent upon outside temperature, during which the space is flooded with heat prior to the normal operational period of said heating means, said heat radiating means emitting heat into said space at a substantially lower rate than heat is radiated into said space by said electrical film heating means during the said initial period, the electrical heating film means reaching its maximum rate of heat emission within one minute of the closure of said switch, and the electrical heating film means, on the closure of said switch, being raised to a temperature within the range 75° F. to 180° F., the electrical power supply means supplying the electrical heating film means, during the said initial period, with at least 15 watts of power for every square foot of the surface area thereof which emits radiant heat into said space, at least a portion of said switch comprising a first contact member having relatively high and relatively low resistance portions, a second contact member which is movable relatively to the first contact member and into and out of contact with the low resistance portion thereof, and means for causing the second contact member, when moving relatively towards the first contact member, to contact the said high resistance portion prior to contacting the said low resistance portion.

12. A vehicle as claimed in claim 6 in which the low temperature electrical heating film means comprises a plurality of films some of which are permanently connected to earth and the remainder of which are connected to earth by a breakable connection.

13. A vehicle having a space therein for the seating of at least one occupant thereof, boundary walls bounding said space, low temperature electrical heating film means carried by and insulated with respect to the boundary walls of said space, said electrical heating film means covering a majority of the nontransparent surface area of the boundary walls and emitting low temperature radiant heat into said space, an engine driven generator carried by the vehicle, a circuit containing the generator, the electrical heating film means, and a switch, the generator supplying said electrical heating film means with low voltage power even during idling speed of the vehicle engine the voltage of the power supplied never being excessive for the heating film means, and means for continuously supplying said space with waste heat from the engine of the vehicle, said waste heat means emitting heat into said space at a substantially lower rate than heat is radiated into said space by said electrical film heating means.

14. A vehicle as claimed in claim 13 in which the generator has two windings, means being provided for selectively arranging said windings in series and in parallel.

15. A vehicle as claimed in claim 13 in which the generator is arranged to charge an accumulator when it is not supplying low voltage power to said low temperature electrical heating film means.

16. A vehicle having a space therein for the seating of at least one occupant thereof, boundary walls bounding said space, low temperature electrical heating film means carried by and insulated with respect to the boundary walls of said space, said electrical heating film means covering a majority of the nontransparent surface area of the boundary walls and emitting low temperature radiant heat into said space, an engine driven generator carried by the vehicle, a circuit containing the generator, the electrical heating film means, and a switch, the generator supplying said electrical heating film means with power even during idling speed of the vehicle engine, means for continuously supplying said space with waste heat from the engine of the vehicle, said waste heat means emitting heat into said space at a substantially lower rate than heat is radiated into said space by said electrical film heating means, and means, operative upon the rotational speed of the engine reaching a predetermined value, for altering the regulation of the generator.

17. A vehicle as claimed in claim 3 in which the generator is connected to charge both a first accumulator, which supplies ignition and lighting current, and a second accumulator, which supplies heating current, means being provided for disconnecting the first accumulator from the generator during the said initial period.

18. A vehicle as claimed in claim 7 in which the second accumulator is connected to the low temperature electrical film heating means by means which prevent the second accumulator from being discharged below a predetermined level.

19. A vehicle having a space therein for the seating of at least one occupant thereof, boundary walls bounding said space, low temperature electrical heating film means carried by and insulated with respect to the boundary walls of said space, said electrical heating film means covering a majority of the nontransparent surface area of the boundary wall and emitting low temperature radiant heat into said space, low voltage electrical power supply means carried by the vehicle and supplying power to said electrical heating film means at a voltage which is never excessive, a circuit containing the electrical heating film means, the electrical power supply means, and a switch, and heat radiating means for continuously emitting heat into said space after an initial period has elapsed since the closure of said switch, said initial period is that period, the length of which is dependent upon outside temperature, during which the space is flooded with heat prior to the normal operational period of said heating means, said heat radiating means emitting heat into said space at a substantially lower rate than heat is radiated into space by said electrical film heating means during the said initial period, said electrical film heating means being supplied with power at their normal operating voltage during said initial period.

20. A vehicle having a space therein for the seating of at least one occupant thereof, boundary walls bounding said space, low temperature electrical heating film means carried by and insulated with respect to the boundary walls of said space, said electrical heating film means covering a majority of the nontransparent surface area of the boundary wall and emitting low temperature radiant heat into said space, low voltage electrical power supply means carried by the vehicle, and supplying power to said electrical heating film means at their normal operating voltage, a circuit containing the electrical heating film means, the electrical power supply means, and a switch, and heat radiating means for continuously emitting heat into said space after an initial period has elapsed since the closure of said switch, said initial period is that period, the length of which is dependent upon outside temperature, during which the space is flooded with heat prior to the normal operational period of said heating means, said heat radiating means emitting heat into said space at a substantially lower rate than heat is radiated into said space by said electrical film heating means during the said initial period.

References Cited in the file of this patent

UNITED STATES PATENTS

| | | |
|---|---|---|
| 2,506,809 | Nims | May 9, 1950 |
| 2,615,115 | Watter | Oct. 21, 1952 |
| 2,698,893 | Ballard | Jan. 4, 1955 |
| 2,737,571 | Eisler | Mar. 6, 1956 |
| 2,787,694 | Farries | Apr. 2, 1957 |
| 2,827,540 | Underwood | Mar. 18, 1958 |
| 2,889,991 | Follansbee | June 9, 1959 |
| 2,932,711 | Adams | Apr. 12, 1960 |
| 3,020,378 | Eisler | Feb. 6, 1962 |

FOREIGN PATENTS

| | | |
|---|---|---|
| 400,673 | Great Britain | Nov. 2, 1933 |